United States Patent
Desai et al.

(10) Patent No.: US 10,909,030 B2
(45) Date of Patent: Feb. 2, 2021

(54) ENHANCED TRIM COMMAND SUPPORT FOR SOLID STATE DRIVES

(71) Applicant: Toshiba Memory Corporation, Tokyo (JP)

(72) Inventors: Girish Desai, Cupertino, CA (US); Saswati Das, Milpitas, CA (US); Senthil Thangaraj, Fremont, CA (US); Barada Mishra, Sunnyvale, CA (US); Julien Magretts, Thame (GB); Philip Rose, Oxfordshire (GB)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/127,754

(22) Filed: Sep. 11, 2018

(65) Prior Publication Data

US 2020/0081830 A1    Mar. 12, 2020

(51) Int. Cl.
*G06F 12/02* (2006.01)
*G06F 11/14* (2006.01)

(52) U.S. Cl.
CPC ...... *G06F 12/0246* (2013.01); *G06F 11/1441* (2013.01); *G06F 12/0292* (2013.01); *G06F 2212/7201* (2013.01); *G06F 2212/7202* (2013.01); *G06F 2212/7205* (2013.01)

(58) Field of Classification Search
CPC ............. G06F 12/0246; G06F 12/0292; G06F 11/1441; G06F 2212/7201; G06F 2212/7202; G06F 2212/7205
See application file for complete search history.

(56) References Cited

U.S. PATENT DOCUMENTS

| 9,152,682 | B2 * | 10/2015 | Ganapathi | ........... G06F 16/2425 |
| 9,251,067 | B1 * | 2/2016 | Tomlin | ................ G06F 12/0284 |
| 2006/0136655 | A1 * | 6/2006 | Gorobets | ............ G06F 12/0246 |
| | | | | 711/103 |
| 2009/0293132 | A1 * | 11/2009 | Henry | ..................... G06F 21/72 |
| | | | | 726/27 |

(Continued)

FOREIGN PATENT DOCUMENTS

| EP | 2965208 A1 * | 1/2016 | ......... G06F 12/0246 |
| JP | 2001078103 A * | 3/2001 | ............... H04N 5/44 |

*Primary Examiner* — Francisco A Grullon
(74) *Attorney, Agent, or Firm* — White & Case LLP (57) ABSTRACT

In an SSD including a host interface, controller, non-volatile memory coupled to the controller, and volatile memory, data is stored in non-volatile memory in clusters having a cluster start address and a cluster end address. A mapping table is maintained in volatile memory, which indicates by a trim signature deallocated clusters in non-volatile memory. The trim table is populated with deallocated ranges and an associated offset within the non-volatile memory. The controller receives from the host interface a sequence of commands including a deallocate command including at least one address range including a start address and an end address, or a start address and a length of the address range. The controller processes the deallocate command by selecting one or both of a write-to-non-volatile-memory action and a record-to-volatile-memory action. In cases of power failure, the mapping table is restored for deallocated ranges at specific offsets recorded in the trim table.

21 Claims, 7 Drawing Sheets

(56) References Cited

U.S. PATENT DOCUMENTS

| | | | |
|---|---|---|---|
| 2012/0110249 A1* | 5/2012 | Jeong | G06F 3/0659 |
| | | | 711/103 |
| 2012/0203958 A1* | 8/2012 | Jones | G06F 12/0246 |
| | | | 711/103 |
| 2013/0275660 A1* | 10/2013 | Bennett | G06F 12/0246 |
| | | | 711/103 |
| 2016/0018999 A1* | 1/2016 | Stenfort | G11C 5/141 |
| | | | 711/154 |
| 2017/0322727 A1* | 11/2017 | Yeh | G06F 3/061 |
| 2018/0276114 A1* | 9/2018 | Kodama | G06F 12/0246 |
| 2018/0373643 A1* | 12/2018 | Chung | G06F 12/0246 |
| 2019/0042102 A1* | 2/2019 | Kim | G06F 12/0246 |
| 2019/0042150 A1 | 2/2019 | Wells et al. | |
| 2019/0163621 A1* | 5/2019 | Doh | G06F 3/064 |
| 2019/0369892 A1* | 12/2019 | Huang | G06F 3/0632 |
| 2019/0377512 A1* | 12/2019 | Hodes | G06F 3/0652 |

* cited by examiner

| Current Host Block Offset (4 Bytes)/MCO | Start Trim LCA (8 Bytes) | End Trim LCA (8 Bytes) |
|---|---|---|
| 20 | 0x0000 | 0x1000 |
|  | 0x2000 | 0x3000 |
|  | 0x4000 | 0x4600 |
| 48 | 0x9000 | 0x9800 |
| 60 | 0xA000 | 0xA200 |
|  | 0xB800 | 0xBA00 |
| ... | ... | ... |

ENHANCED TRIM COMMAND SUPPORT FOR SOLID STATE DRIVES

FIELD OF THE INVENTION

The present invention generally relates to systems and methods to process deallocate commands in solid state drives (SSDs).

BACKGROUND OF THE INVENTION

SSDs store data in non-volatile memory, such as NAND flash memory, in units of pages and erase data in units of memory blocks that are made up of a plurality of pages. A host computer communicates commands to the SSD containing logical block addresses (LBAs) and the SSD maps these addresses into physical memory addresses using a logical to physical (L2P) mapping table. With a deallocate or "trim" command, issued by a host when it determines that data associated with an LBA, or number of LBAs, is no longer needed or deleted, for example in a file system or storage system, an SSD will deallocate or "unmap" data stored in the physical page or pages in a block mapped from the LBA or LBAs using the L2P table. These deallocate commands indicate data sections that are no longer being used, and increase the write and read performance and reliability of the device by removing unnecessary references to data in a Logical to Physical (L2P) mapping table, thereby reducing write amplification, assisting in better garbage collection and enhancing the life span of the SSD. When a number of data pages of a block becomes invalid, only the valid data pages remaining in the block have to be copied to a new block and the existing data block can be erased. Without deallocate commands, unused or deleted file system data remains as valid data pages in blocks, thereby impeding efficient garbage collection, increasing write amplification of the SSD and down throttling the write performance of the SSD.

Conventional deallocation processing methods store the deallocate commands in the non-volatile memory of an SSD, where they occupy and reduce the over provisioning (OP) space thus increasing the write amplification of the SSD. In cases of power failure, upon resumption of power these conventional methods use the deallocate commands stored in the non-volatile memory to reconstruct the L2P mapping table along with other write commands. If while reading a deallocate command stored in the non-volatile memory in order to resume its processing an uncorrectable (UNC) error is encountered, there is no way to retrieve the deallocation address ranges and information according to the conventional methods.

Accordingly, there is an unmet need for SSDs to be capable of efficiently handling deallocate commands and preserving continuity of commands following power failures.

BRIEF DESCRIPTION OF THE INVENTION

In an aspect, an SSD for processing deallocate commands includes a host interface and a controller communicatively coupled to the host interface. The SSD also includes a non-volatile memory communicatively coupled to the controller which stores data received via the host interface in a plurality of data clusters, each data cluster having an associated cluster start address and cluster end address. The SSD also includes a volatile memory which maintains a trim table and a mapping table indicating which of the plurality of data clusters stored in the non-volatile memory have been deallocated. The mapping table assigns a trim signature to deallocated ranges instead of a physical address. The controller of the SSD receives a sequence of commands from the host interface, receives a deallocate command from the host interface within the sequence of commands to deallocate at least one address range indicating data stored in the non-volatile memory. The at least one address range may include a start address and an end address, or a start address and length of the address range. The end address can be calculated from the start address and the length of the address range. The controller processes the deallocate command by selecting one or both of a write-to-non-volatile-memory action and a record-to-volatile-memory action to perform based on the start address and the end address.

In another aspect, a method of processing deallocate command includes receiving a sequence of commands at a host interface, receiving a deallocate command from the host interface within the sequence of commands to deallocate at least one address range indicating data stored in a non-volatile memory, the deallocate command including at least one address range including a start address and end address, or a start address and and length of the address range in logical blocks. The end address can be calculated from the start address and the length of the address range. The data stored in the non-volatile memory is stored in at least one data cluster, each data cluster having a cluster start address and a cluster end address. The method also includes processing the deallocate command by selecting one or both of a write-to-non-volatile-memory action and a record-to-volatile-memory action to perform based on the start address and length in logical blocks.

DETAILED DESCRIPTION OF THE INVENTION

SSDs store data at a physical address in the non-volatile memory referred to by one or more logical addresses (for example, LBAs) by the host and the SSD controller. The SSD controller identifies groupings of data of a particular size as data clusters (for example, a number of logical blocks). An LBA received from the host can be converted by the controller to a logical cluster address (LCA) referring to a cluster of data in the non-volatile memory, that in turn corresponds to a physical media cluster address (MCA) on the memory device. A host may refer to an address range by a start address (LBA) and a length in logical blocks which may be converted to start and end LBAs by the SSD controller. The end LBA may be calculated using the formula:

$$\text{End } LBA = \text{Start } LBA + L - 1$$

(where L is the length in logical blocks). A logical cluster may contain a number of logical blocks, for example 8 logical blocks, and a conversion of an LBA to an LCA (in cases of a single namespace) may use the formula:

$$LCA = LBA \text{ div } 8$$

(where 'div' is the integer division operator, giving the quotient after division), which is also the LCA of the start of the cluster containing that LBA. A test to determine if an LBA lies on a cluster boundary (i.e. the LBA at the start of a cluster) may use the formula:

$$LBA \bmod 8 = 0$$

(where 'mod' is the modulo operator, giving the remainder after integer division). An LBA which gives the result '0' lies on a logical cluster boundary, at the start of a logical cluster. An LBA which gives the result '7' lies at the end of a logical cluster. An LBA range with start and end LBAs which lie at the start and end of a cluster respectively, or with a start LBA on a cluster boundary and a length which is an integer multiple of logical blocks, occupies a number of complete logical clusters. An LBA range with a start LBA which gives any other number than 0 after division modulo 8 will occupy a partial cluster as its first logical cluster. An LBA range with an end LBA which gives any other number than 7 after division modulo 8 will occupy a partial cluster as its last logical cluster.

A host issues various commands, such as write, read, or deallocate commands, to the SSD which handles the commands accordingly. A host can issue deallocate commands interspersed between write commands and read commands such that there is "write overlap," meaning that the logical address ranges of succeeding commands may overlap one another.

Deallocate commands (also referred to as trim commands herein) constitute a single address range or multiple address ranges describing data locations in the non-volatile memory which are to be deallocated. In some cases, the address range or ranges in a deallocate command may refer to large portions of the memory, which may be several GB in size, or even the entire memory.

Various computational protocols require deallocate commands to be deterministic, such that after execution of a deallocate command at an LBA, if the host asks the device to read the data at the LBA and the device returns a value, for example all "0" bits, indicating that the data at the address is deallocated, then a deterministic deallocate command returns the same results ("0"s, "1"s, or old data) regardless of when the host issues the read command after the deallocate command is complete. For example, if the host issues a read command a few microseconds after the SSD executes a deallocate command and the SSD returns old data as a response, all successive reads must also return the same response until the range is written again. Deterministic deallocate commands must maintain coherency of the deallocate command amidst other issued commands such as read or write commands for the same LBA. For example, an SSD receives a write command to a particular address, followed by a command to deallocate the same address, and finally a command to read the data at the address. In order to maintain coherency, the SSD must return the appropriate response to the final read command ("0"s, "1"s, or old data, as appropriate) according to the order of the previously completed commands.

Improved methods of processing deallocate commands maintain the coherency of data in a memory device, and improve efficiency of garbage collection. Further, improvements in the processing of deallocate commands enables efficient recovery of data following a power loss event.

Figure 1:
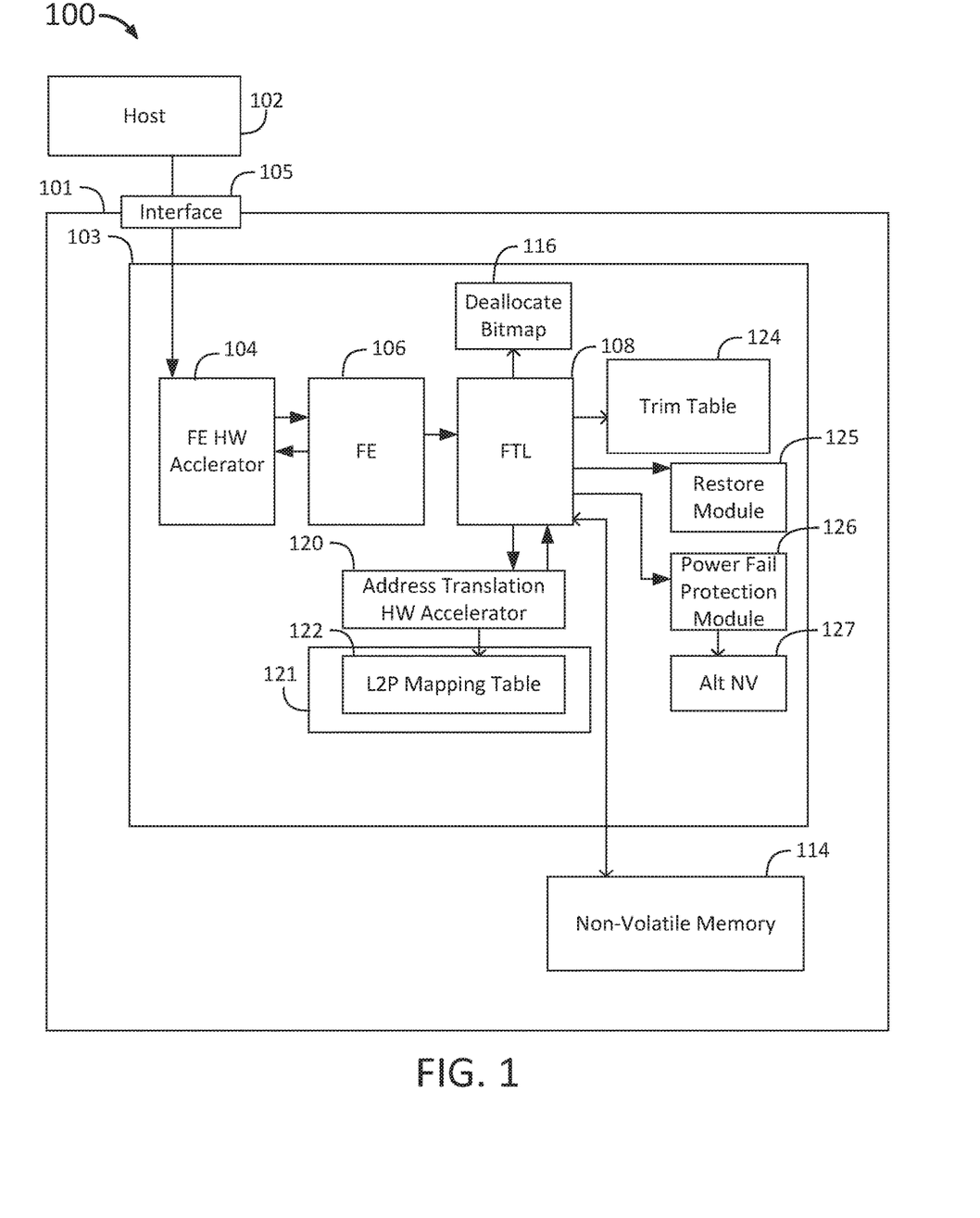
FIG. 1 shows a block diagram of an SSD system for processing of deallocate commands.

FIG. 1 shows a block diagram of an SSD system 100 for processing of deallocate commands without saving commands to the OP space in the non-volatile memory 114. The SSD system 100 includes a host 102, a SSD 101 having a controller 103, and a non-volatile memory 114. The controller 103 includes a host interface 105, a front end hardware accelerator 104, a front end module 106, a flash translation layer (FTL) 108, a trim table 124, a deallocation bitmap 116, an address translation hardware accelerator 120, and an L2P mapping table 122 stored in a volatile memory 121. The controller 103 also includes a restore module 125, a power fail protection module 126, and an alternative non-volatile memory 127.

In the SSD system 100, an SSD receives a deallocate command from the host 102 at the SSD 101 via the host interface 105. The front end hardware accelerator 104 then receives the deallocate command from the host interface 105 and transmits the command to the front end module 106. The host 102 transmits the deallocate command including an LBA range, or ranges, of data stored in the non-volatile memory to be deallocated or 'unmapped' because the data stored at these LBAs has been deleted in the file system of the host 102.

The controller 103 converts the LBA received from the host 102 to an LCA referring to one or more clusters on the non-volatile memory 114. A deallocate command typically includes a data range, or multiple ranges (up to a maximum of 256 data ranges in some protocols such as NVMExpress (NVMe)) consisting of a start address (LBA start) and length in logical blocks, which may be converted to a start LBA and end LBA), and the controller converts this to an LCA start and an LCA end. For example, an address range of LBA 0 to LBA 7 corresponds to 8 logical blocks each of size 512 bytes, but when converted to LCA, this LBA corresponds to one 4 KB cluster of data stored in the non-volatile memory 114.

The front end module 106 transmits the command to the flash translation layer 108. The flash translation layer 108 determines the offset of the deallocate command address within the non-volatile memory 114 (the address in the non-volatile memory at which the deallocate command would have been written in conventional methods) and allocates the entry or entries in the trim table 124. The flash translation layer 108 copies the range(s) and offset of the deallocate command into the trim table 124.

The flash translation layer 108 updates the deallocate bitmap 116 to indicate the addresses that have been deallocated and sends a request that the address translation hardware accelerator 120 update the L2P mapping table 122. The address translation hardware accelerator 120 converts the deallocate command from a logical LCA address to a physical MCA associated with the deallocated data clusters to be recorded in the L2P mapping table 122. The address translation hardware accelerator 120 updates the L2P mapping table 122 with the MCA addresses that are no longer in use, and transmits a response to the front end module 106 via the flash translation layer 108. The controller 103 records the deallocate command range or ranges in the L2P mapping table 122 at the appropriate MCA(s) as a "trim signature," indicating that the associated address in the non-volatile memory has been deallocated and is no longer in use, and denoting the corresponding NAND for the deallocated clusters. The L2P mapping table 122 thus maps the logical to physical address for data written and assigns a trim signature for deallocated address ranges. The front end module 106 completes the deallocate command from the host perspective by sending a deallocate command completion status to the host 102 via the host interface 105. Once controller 103 writes the L2P mapping table 122 stored in the volatile memory 121 to the non-volatile memory 114, the flash translation layer 108 releases or removes the entries in the trim table 124.

The SSD system 100 of FIG. 1 improves the efficiency of processing of deallocate commands compared to conventional systems by storing deallocate commands as entries in a table in the volatile memory rather than in non-volatile memory 114. Conventional systems process deallocate commands by assigning the deallocate command a position in the write layout as if it were a write command from the host and writing the deallocate command into the non-volatile memory in the user data blocks reserved for OP space. In contrast, the SSD system 100 maintains the deallocation address range and start and end addresses for every deallocate command, and the sequence position of the deallocate command in relation to the order of other received commands, as entries in the trim table 124 in volatile memory until the mapping data is flushed to the non-volatile memory 114, without writing the commands themselves to the non-volatile memory. The controller 103 maintains the order of the deallocate commands relative to other commands received from the host (for example, write commands occurring before and after) through the media cluster offset (MCO). The MCO records the offset of the command within the command order, indicating where the deallocation command and trim range parameters would have been written in the user data blocks in the non-volatile memory in the conventional system.

When garbage collection occurs, the flash translation layer 108 retrieves trim signature addresses from the L2P mapping table 122 to identify data that is no longer valid. If the L2P mapping table 122 were not updated with the trim signature to indicate deallocated data, the data would be treated as valid data in the non-volatile memory and would be moved to a new block before clearing the original block. Thus, the use of deallocate commands generally improves the efficiency of garbage collection.

In the event of a power loss, a power fail protection module 126 in the controller 103 saves the information in the trim table 124 to a special user block in an alternative non-volatile memory 127. Secondary power provided by a capacitor enables saving the trim table following determination of a power loss event. In some implementations, the controller 103 saves the trim table 124 to a special user block in non-volatile memory 114, though this may require additional power than saving to a local alternative non-volatile memory 127. In some implementations, the trim table 124 may be saved in non-volatile memory 114 using a pseudo single level cell (pSLC) programming mode if using multiple, triple or quadruple level cell (MLC, TLC or QLC) mode NAND flash. Because the L2P mapping table 122 is stored in volatile memory 121 in the controller 103 and intermittently flushed to the non-volatile memory 114, during a power loss event the last executed deallocate commands may not be recorded in the version of the mapping table saved in the non-volatile memory, and the L2P mapping table 122 in the volatile memory 121 may be incorrect, incomplete or lost. The saved data from the trim table 124 is used by the flash translation layer 108 and a restore module 125 to update the L2P mapping table 122 upon reboot.

Figure 2:
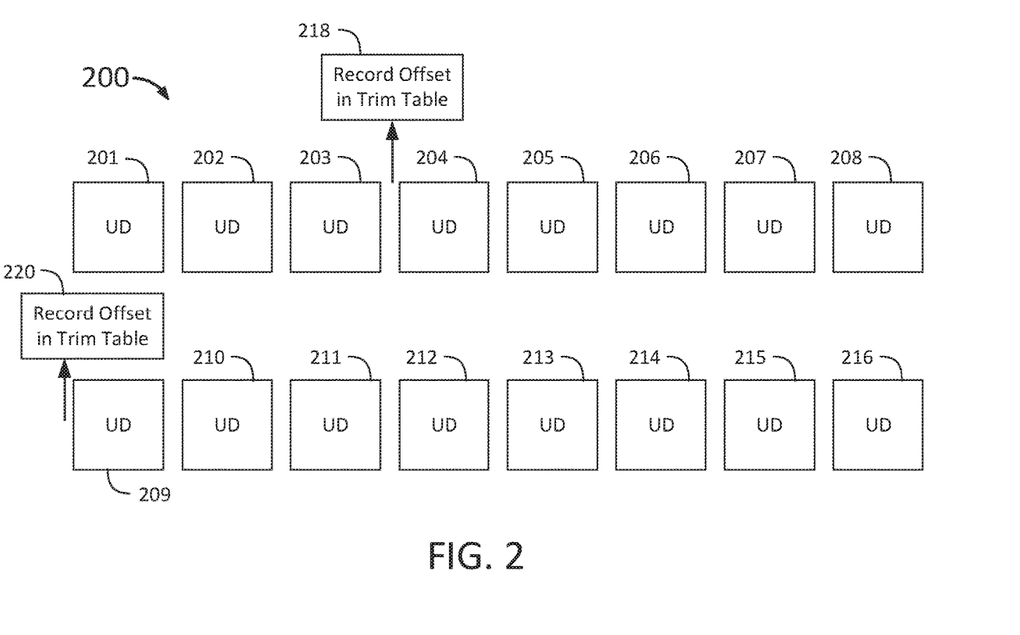
FIG. 2 shows a block diagram of storage of deallocate commands as offsets in a trim table.

FIG. 2 shows a block diagram 200 of storage in non-volatile memory of deallocate commands as they are received from the host. The block diagram 200 includes user data blocks 201-216, also referred to as clusters, arranged in two rows, each containing 8 data blocks. A user data block may be 4K bytes of data, or any other suitable amount of data, and may be used to contain commands received from the host, including write commands, and data parameters associated with those commands. Deallocate commands are not stored in a user data block, but instead the position of the user data block which the deallocate command would have occupied is recorded. Each user data block has an associated MCO offset which defines the position of the data block within the user data area and is used to indicate sequence position of the command in the user data block since commands are allocated the next user data block in sequence in the order they are received from the host.

All user data blocks 201-216 in FIG. 2 are labeled as "UD" or "user data." Deallocate commands for blocks or clusters that have been deallocated and no longer contain valid data are recorded in a trim table with respect to the next available offset in the user data block buffer (for example, the trim table 124 shown in FIG. 1), instead of recording the deallocate command and range parameters directly in the user data block as in conventional methods.

For example, if user data block 204 were to be the next user data block to represent a deallocate command, an offset 218 to data block 204 is recorded in the trim table instead of storing the command in user data block 204. The offset 218 indicates the position of the deallocate command in the stored command time sequence. A deallocate command that would have occupied user data block 209 is also marked by an offset 220 that is recorded in the trim table rather than the deallocate command being saved in the user data block sequence. By referring to the trim table, the controller can determine the position of deallocate commands in the sequence of saved commands recorded in user data blocks 201-216.

In conventional deallocate command processing methods, every deallocate command irrespective of range size is stored in user data blocks in the non-volatile memory, instead of in a trim table in the volatile memory, thereby greatly increasing the write amplification of the memory device. Additionally, in conventional systems, deallocate commands saved in the user data blocks occupy the space reserved for OP, decreasing the available space for other tasks and increasing the write amplification. Further, in these conventional systems the deallocation address ranges are a type of metadata that should be stored with a higher level of error correction protection than is available in user data blocks. During recovery from a power loss event, if the deallocate command had been stored in the user data block and it cannot be subsequently read due to an uncorrectable (UNC) error, there is no way to retrieve the deallocation address ranges and the trim information is lost causing the deallocation to be non-deterministic over the power loss event.

Figure 3:
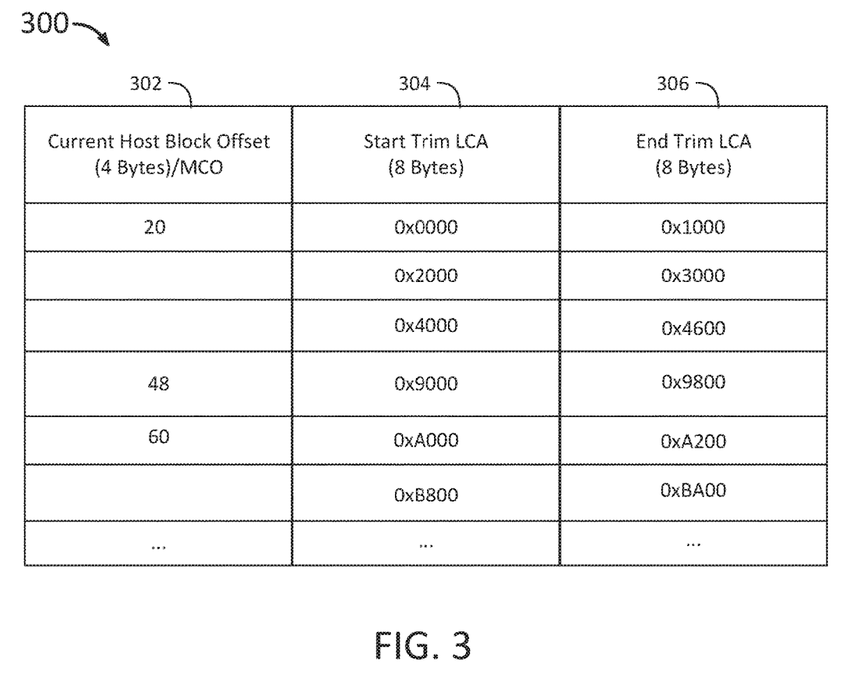
FIG. 3 shows a block diagram of an exemplary trim table.

In contrast, storing the sequence position of deallocate commands as an offset 218 in a trim table significantly reduces write amplification and decreases power usage as compared to the conventional methods. FIG. 3 shows a block diagram of an exemplary trim table 300. The trim table 300 is a table including entries with values denoting the sequence position of the deallocate command and its range parameters saved as current host block offset 302 in MCO, the start trim LCA 304, and the end trim LCA 306. The trim table 300 functions as a record of the deallocate command instead of storing it in the user data area. The controller (e.g., controller 103 in FIG. 1) records in the trim table 300 all data required to indicate the sequence position of the command and which logical clusters (e.g., deallocate command at MCO 20 with LCAs 0x0000 to 0x1000, 0x2000 to 0x3000, and 0x4000 to 0x4600, deallocate command at MCO 48 with LCA 0x9000, and deallocate command at MCO 60 with LCAs 0xA000 to 0xA200 and 0xB800 to 0xBA00 as shown in FIG. 3) are no longer valid. Each deallocate command may include multiple address ranges as illustrated by MCO 20 and MCO 60, or may include a single address range to be deallocated as illustrated by MCO 48. The current host block offset 302 indicates the offset to the deallocate command within the saved host command sequence in the user data area, in which the user data is treated as a circular buffer and the offset is a pointer into the buffer that indicates where the command is positioned compared to other host commands (for example, write commands). The offset is valid at any point in time. The start trim LCA 304 that indicates the logical cluster address of the start of the deallocated data is also recorded in the trim table 300, as is the end trim LCA 306 indicating logical cluster address where the deallocated data ends. The logical cluster addresses are composed of 8 bytes of data, while the user data block offset is composed of 4 bytes per MCO.

By recording the user data block offset 302 representing the position of the deallocation command in the saved host command sequence in the trim table 300 instead of the deallocate command itself in the user data blocks in the non-volatile memory, the deallocate command and parameters do not take up OP space of the SSD's non-volatile memory data storage and do not increase the write amplification.

The trim table 300 is used by the controller in the processing of deallocate commands, including the updating of the L2P mapping table following a power loss event. As an example, during an updating using the trim table 300, the controller would determine that the first recorded offset is 20. The controller would then process write commands at offsets 0-19 in the user data block buffer in non-volatile memory, until the offset of the next user data block to be processed was 20, at which point it would then process a deallocate command for offset 20 according to the contents of the trim table entry with that offset, prior to resuming to process the write command in the user data block at offset 20 and following. For the deallocate command at MCO 20, the mapping table is updated based on the trim table 300 because the offset recorded in the trim table 300 is 20. The mapping table is updated according to the start trim LCA 304, and the end trim LCA 306 recorded in the trim table for each range in the deallocate command MCO 20. The controller continues to update the mapping table for write commands stored at MCOs 20-47 based on the user data blocks at those offset in the buffer in non-volatile memory, and finally reconstructs the command for MCO 48 as a deallocate command based on the host block offset 302 in the trim table 300 using the start trim LCA 304, and the end trim LCA 306. The controller updates the mapping table for write commands stored at MCOs 48-59 according to the user data blocks at those offset values in the buffer in the non-volatile memory, and then reconstructs the command for MCO 60 as a deallocate command based on the host block offset 302 in the trim table 300 using the start trim LCA 304 and the end trim LCA 306 for each range in the deallocate command for MCO 60.

Accordingly, during reconstruction by recovery and updating following a power failure event, the controller reads command parameters from two different sources to update the mapping table, rather than only reading directly from the non-volatile memory as in conventional methods. If power loss occurs before the controller saves the mapping table into the non-volatile memory, the controller saves the trim table 300 into a save block in a local non-volatile memory within the controller. The save block is highly reliable, using a pSLC programming mode or a stronger error correction codes compared to other conventional methods for saving data. Recording the data in the trim table 300 and using a highly reliable save block keeps the data safe from UNC errors and ensures trim determinism even after recovery following a power loss event. Thus, this method of deallocate command processing reduces write amplification, increases drive endurance and improves garbage collection by storing the trim data in a trim table in volatile memory, and requires a smaller amount of power than conventional processes. Because no trim command buffer in user data blocks in non-volatile memory is required, buses and dies associated with the non-volatile memory are better utilized and secondary power to the buffers is saved. This method does not utilize user data OP space to store the trim data, and maintains determinism across power loss.

Figure 4:
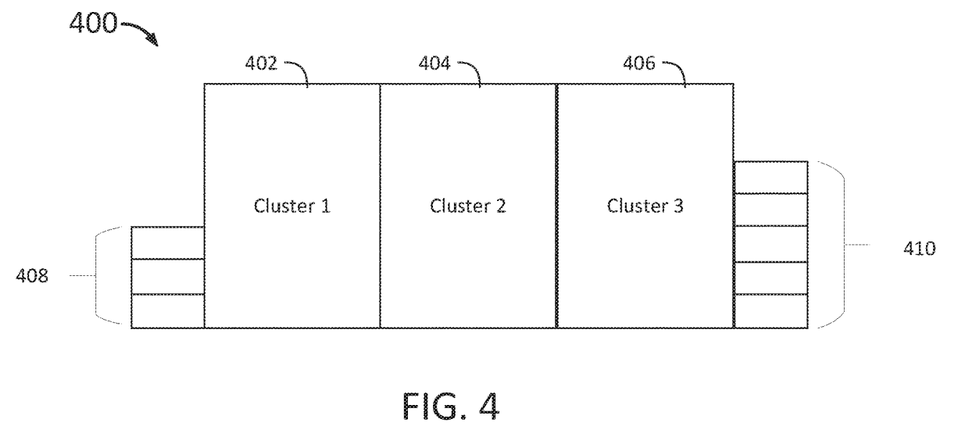
FIG. 4 shows a block diagram of data requested to be deallocated according to an exemplary deallocate command.

Some deallocate commands may specify an address in the trim range that is not aligned with a start of a cluster. FIG. 4 shows a block diagram 400 of data requested to be deallocated according to an exemplary deallocate command. As described above, the user data blocks are described by clusters of 4 KB. Each trim range has a logical block start address and a logical block end address indicating the logical address range described by the trim command. Deallocate commands having trim ranges that start and end on cluster boundaries are considered "aligned" with the clusters, while trim ranges that begin or end part way through cluster boundaries are "unaligned." The block diagram 400 includes a first cluster 402, a second cluster 404, and a third cluster 406, as well as an initial partial cluster 408 and a final partial cluster 410 that are described by a request for deallocation of a range which is a total of 5 clusters from a host, but where the starting logical address is not aligned with a cluster boundary. Such a request includes a reference to partial clusters and is not aligned with cluster boundaries.

In order to process the data request shown in the block diagram 400, the controller first determines that the request is not aligned with the clusters of data stored in non-volatile memory, in order to determine whether to process the command by a write-to-non-volatile memory action and/or by a record-to-volatile-memory action. The controller determines clusters associated with the start address LBA and with the end address LBA of the trim range. The controller determines that either the start address LBA received from the host does not correspond to a start boundary of a data cluster and/or the end address LBA does not correspond to an end boundary of a data cluster.

In the example in block diagram 400, the deallocation request includes both an initial and a final partial cluster in the trim range. A request need not include both an initial and final partial cluster, and may include only one of the two, or none, depending on the start and end logical addresses of the trim range. Once the controller has determined that the request is not aligned with the clusters, the controller proceeds with the write-to-non-volatile-memory action. The controller determines the number of bytes that are unaligned at the beginning and/or end of the requested address range. For all unaligned data that belong to a partial cluster, the controller converts the request for data deallocation into a Write Zeroes command to write "0" to these locations, thereby deallocating the portions of the cluster separately. The rest of the address range that is aligned with the clusters is then treated normally, using the record-to-volatile-memory action by marking the offset to the blocks as well as a start and end in the trim table (i.e. the trim table 300 of FIG. 3). The start and the end that are indicated in the trim table refer not to the received start and end that included the unaligned partial clusters, but to the full aligned clusters within the request, as the partial clusters are dealt with by a separate Write Zeroes commands.

In processing the deallocate command referring to the data in the example in block diagram 400, the controller checks the start logical address of the deallocate command and determines that the start logical address does not lie on a cluster boundary (in other words, that the start logical address is not the same as the start logical address of a cluster, or LBA mod 8 does not equal 0). The controller determines a next cluster following the initial partial cluster, and determines a number of logical blocks of data between the start logical address of the deallocate command and the beginning of the next cluster. The controller then transmits a Write Zeroes command to write zeroes to the number of logical blocks beginning with the start logical address of the deallocate command, in this case 3 512 byte logical blocks. The start cluster address of the next cluster following the initial partial cluster is recorded as the start trim LCA. The controller also determines if the end logical address of the deallocation address range lies next to a cluster boundary (in other words, that the end logical address is the same as the end logical address of a cluster, or LBA mod 8=7), and if so, if it is aligned with an end cluster address. If the end logical address is aligned with the end of a cluster, then that cluster address is recorded as the end trim LCA in the trim table, with the range extending only to the end of that cluster. If the end logical address does not lie on a cluster boundary (LBA mod 8 not equals 0), then the controller determines a number of logical blocks from the start of the cluster containing the LBA (LBA div 8 in cases of a single namespace) to the end logical address and transmits a Write Zeroes command for this number of logical blocks beginning at the previous cluster boundary. The start cluster address of the previous cluster is recorded as the end trim LCA in the trim table, with the trim range now extending only to the end of that previous cluster. In this way, any partial clusters included in the deallocate command are deallocated by writing zeroes, while the bulk of the deallocate command is indicated by recording the start and end LCA of the address range in the trim table in the volatile memory.

In the example in the block diagram 400, after writing the initial zeroes for the partial cluster, the controller records the LCA in the trim table corresponding to the start cluster address of first aligned cluster 402. The controller determines that the end address does not align with the end of third cluster 406, and determines the number of logical blocks by which the address range extends past the end cluster address of the third cluster 406. The controller transmits a Write Zeroes command for the unaligned partial cluster. The controller then records the LCA in the trim table corresponding to the last aligned cluster 406.

The partial clusters are separately deallocated because the mapping table is designed to operate with a cluster granularity which enables a more compact mapping table but means it is unable to work with partial clusters. The SSD logic design includes a method to handle partial writes to a cluster, which may be reused to perform a Write Zeroes to any partial clusters in the ranges of a trim command which makes the handling of partial clusters more efficient and guarantees write coherency. Full clusters are treated as described above with regard to FIG. 1 and are referred to by the trim table.

Figure 5:
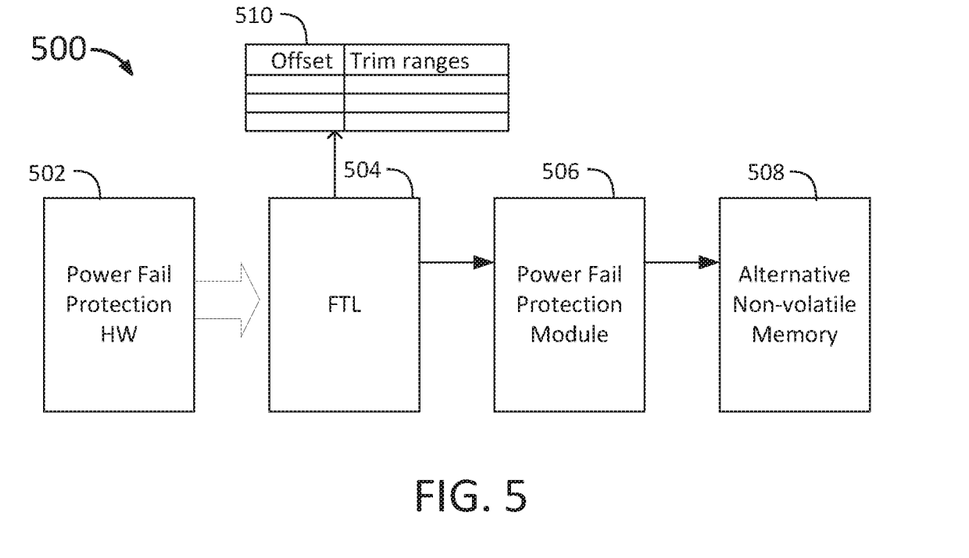
FIG. 5 shows a block diagram of a process of storing deallocated ranges following a power failure.

FIG. 5 shows a block diagram 500 of storing deallocated ranges following a power failure. Block diagram 500 includes a power fail protection hardware module 502, a flash translation layer 504 (for example, flash translation layer 108 in FIG. 1), a power fail protection module 506 (for example, power fail protection module 126 in FIG. 1), an alternative non-volatile memory 508 (for example, alternative non-volatile memory 127 in FIG. 1) and a trim table 510 (for example, trim table 124 in FIG. 1). These components and modules may be instantiated in a device controller such as controller 103 in FIG. 1.

When a power loss triggers an asynchronous event, the power fail protection hardware module 502 begins operation. The flash translation layer 504 reads the entire trim table 510 and requests that a power fail protection module 506 begin operation. The power fail protection module 506 saves the trim table 510 into an alternative non-volatile memory 508. The power fail protection module 506 may include using a capacitor as a secondary power source to enable the saving of the trim table 510. The saved trim table 510 can then be used upon reboot to reconstruct the mapping table to maintain coherence and determinism of the deallocation across the power failure.

Figure 6:
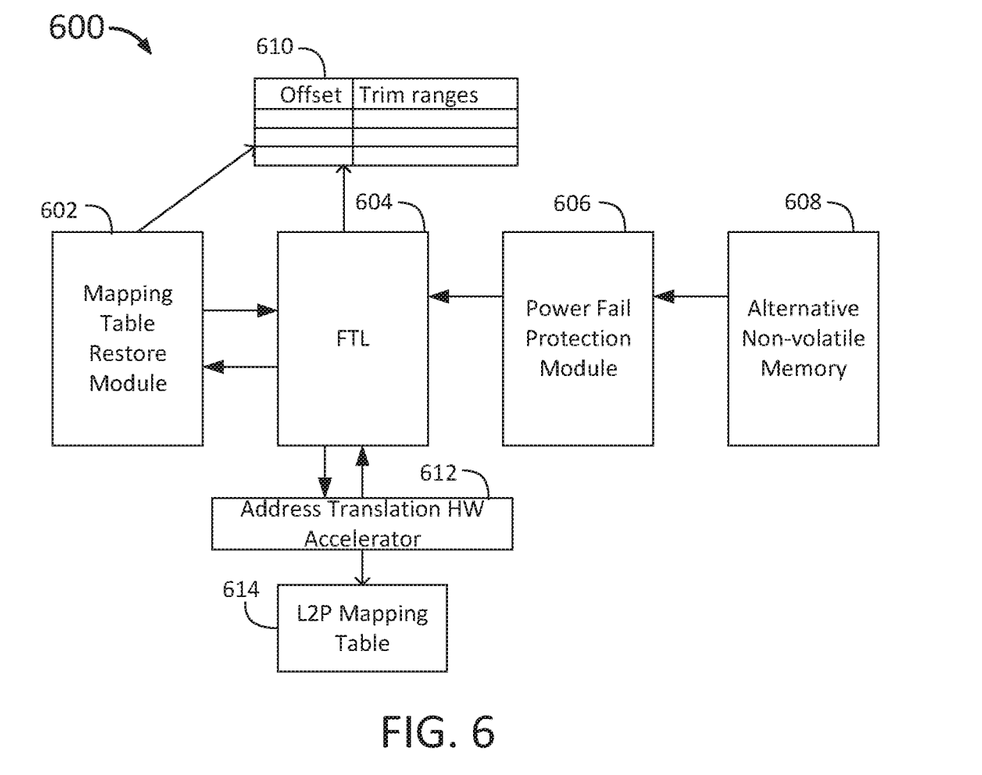
FIG. 6 shows a block diagram of a process of reconstruction of the mapping table using stored deallocate command ranges upon resumption of power following a power failure.

FIG. 6 shows a block diagram 600 of a process of reconstruction of the mapping table using stored deallocated ranges upon resumption of power following a power failure. Block diagram 600 includes a mapping table restore module 602, a flash translation layer (for example flash translation layer 108 in FIG. 1), a power fail protection module 606 (for example power fail protection module 126 in FIG. 1), an alternative non-volatile memory 608 (for example alternative non-volatile memory 127 in FIG. 1), an address translation hardware accelerator 612 (for example address translation hardware accelerator 120 in FIG. 1), an L2P mapping table 614 (for example L2P mapping table 122 in FIG. 1), and a trim table 610 (for example trim table 124 in FIG. 1 or trim table 300 in FIG. 3). Similarly to FIG. 5, these components and modules may be instantiated in a device controller such as controller 103 in FIG. 1.

Following reboot after a power failure, the controller reconstructs the mapping table to ensure that the mapping table saved in the volatile memory is consistent with the executed deallocate commands in the non-volatile memory. During reboot following the power failure event, the power fail protection module 606 restores the trim table 610 along with the user data from the alternative non-volatile memory 608, and passes the restored trim table information to the flash translation layer 604. The flash translation layer 604 reads the trim table and triggers the mapping table restore module 602. The mapping table restore module 602 restores trim commands from the trim table and starts their execution where for each entry in the trim table it determines the current trim offset value in the trim table 610 and uses this to determine the execution sequence position of the trim command with respect to other commands (such as write commands) within the user data blocks stored in the non-volatile memory which are also being restored and resumed. At that point the mapping table restore module 602 requests that the flash translation layer 604 perform an unmap process on the LCA range indicated in the trim table 610. The flash translation layer 604 runs the unmapping of the LCA range by requesting that the address translation hardware accelerator 612 update the L2P mapping table 614. With the LCAs for the trim range returned, the flash translation layer 604 can perform updates to the mapping table 614 and the deallocate bitmap (for example deallocate bitmap 116 in FIG. 1) to record the trim updates. This process is repeated until the entire trim table is processed. By this process, the mapping table is reconstructed based on deallocate commands and write commands completed before the power loss, and the reconstructed mapping table can then be written to the non-volatile memory.

Figure 7:
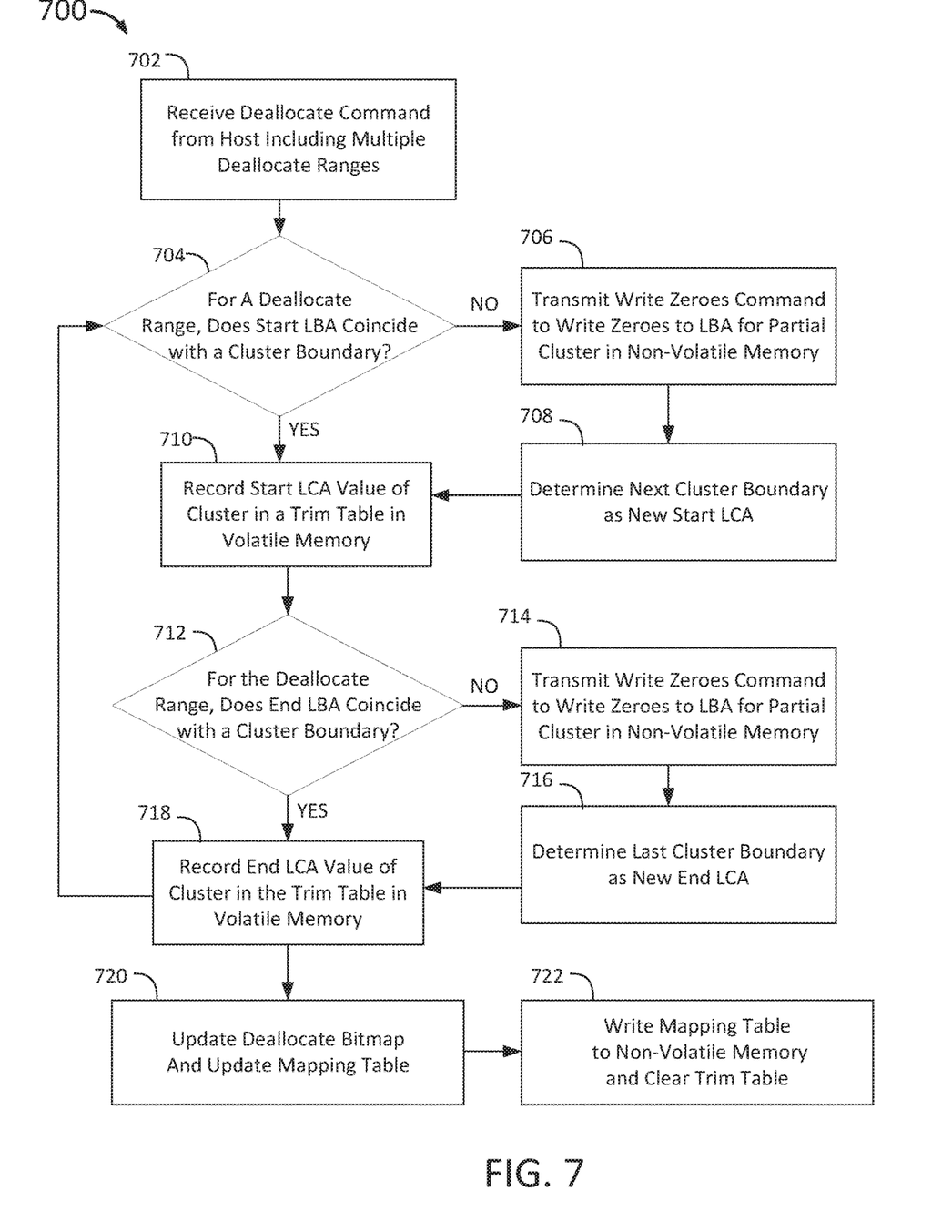
FIG. 7 shows a flow chart of the processing of a deallocate command under operational conditions.

FIG. 7 shows a flow chart 700 of the method of processing of a deallocate command received at a controller under operational conditions. At step 702, the controller receives a deallocate command from the host. The deallocate command may include multiple deallocate ranges which may be discontinuous. For each range in the command, the deallocate command indicates an LBA address range to be marked invalid or no longer used in a non-volatile memory. The LBA address includes a start LBA and a length which is converted by the controller to a start LBA and an end LBA. At step 704, for a first deallocate range in the deallocate command, the controller determines if the start LBA coincides with a cluster boundary, for example, according to the process described with regard to FIG. 4. The controller converts the LBA address range to an LCA address range to refer to the logical cluster addresses within the memory device. If the controller determines that the start LBA coincides with a cluster boundary, the process continues to step 710, and the start LCA value of the cluster coinciding with the start LBA of the deallocate range is recorded in a trim table stored in the volatile memory. If the controller determines that the start LBA does not coincide with a cluster boundary, the LBA range begins with a partial cluster and the process continues according to a write-to-non-volatile-memory action at step 706. At step 706, the controller transmits a Write Zeroes command to write zeroes to the LBA for the partial cluster in the non-volatile memory. At step 708, the controller determines the next cluster boundary for use as the new start LCA for the portion of the deallocate range including complete clusters. The process then continues to step 710 where the controller records the new start LCA corresponding to the next cluster boundary in the trim table in the volatile memory. The controller allocates an entry in a trim table for the offset value and LCA address start and end. The trim table acts as a record of the start and end LCA addresses of the trim range and can be used in processing of the trim commands while operating under normal operational power conditions and also when restoring trim ranges in the mapping table during recovery following a power failure.

At step 712, the controller makes a similar determination regarding the end of the current deallocate range. The controller determines if the LBA end coincides with a cluster boundary, and, if the LBA end does coincide with a cluster boundary, proceeds to step 718. At step 718, the controller records the end LCA value of the cluster to which the LBA end coincides in the trim table in the volatile memory. If the controller determines that the LBA end does not coincide, the process instead moves from step 712 to step 714. At step 714, the controller transmits a Write Zeroes command to write zeroes to the LBA for the partial cluster at the end of the LBA range in the non-volatile memory. At step 716, the controller determines the previous cluster boundary for use as the new end LCA for the portion of the deallocate range including complete clusters. The process then continues to step 718, where the new end LCA is recorded in the trim table in the volatile memory.

Steps 704-718 are repeated for each deallocate range of the deallocate command. After the ranges have been processed by one or both of the write-to-non-volatile-memory action and record-to-volatile-memory action, the process continues to step 720. At step 720, the controller updates the deallocate bitmap and the mapping table with the deallocated logical data clusters. At step 722, the controller writes the mapping table to a non-volatile memory and clears the trim table when the user data block is closed.

Figure 8:
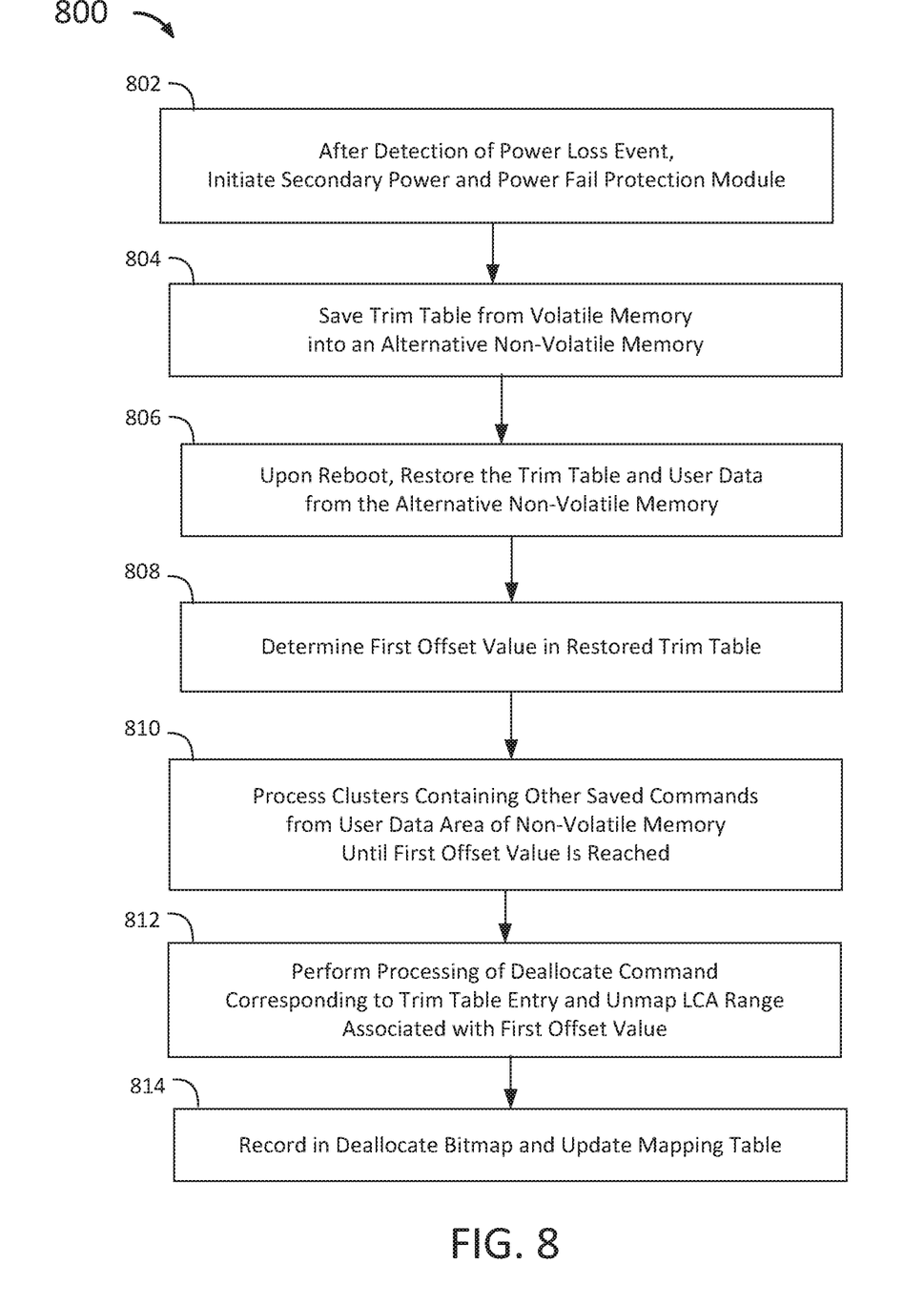
FIG. 8 shows a flow chart of the restoring of deallocated ranges in a mapping table following reboot after power loss.

FIG. 8 shows a flow chart 800 of a method of restoring the deallocated ranges in a mapping table by a controller during recovery following a power loss. At step 802, following detection of a power loss event, the controller initiates secondary power and the power fail protection module begins operation. At step 804, the controller saves the trim table from the volatile memory into an alternative non-volatile memory. In the alternative non-volatile memory, the trim table is safe from being lost or corrupted during the power failure and upon reboot can be relied on to perform updates to the mapping table when it is restored from non-volatile memory into volatile memory. In some implementations, the alternative non-volatile memory is a save block in the non-volatile memory.

At step 806, upon reboot, the controller restores the trim table and user data from the alternative non-volatile memory where it was saved. At step 808, the controller determines the first offset value in the restored trim table. At step 810, the controller reads clusters containing other saved commands (for example, write commands) from the user data area of non-volatile memory, processing those commands until it reaches the first offset value in the trim table. At step 812, after the controller reaches the first offset value, the controller performs processing of the deallocate command corresponding to the associated trim table entry and unmaps the LCA range associated with the first offset value. At step 814, the controller records the trimmed data in the deallocate bitmap and updates the mapping table accordingly.

Figure 9:
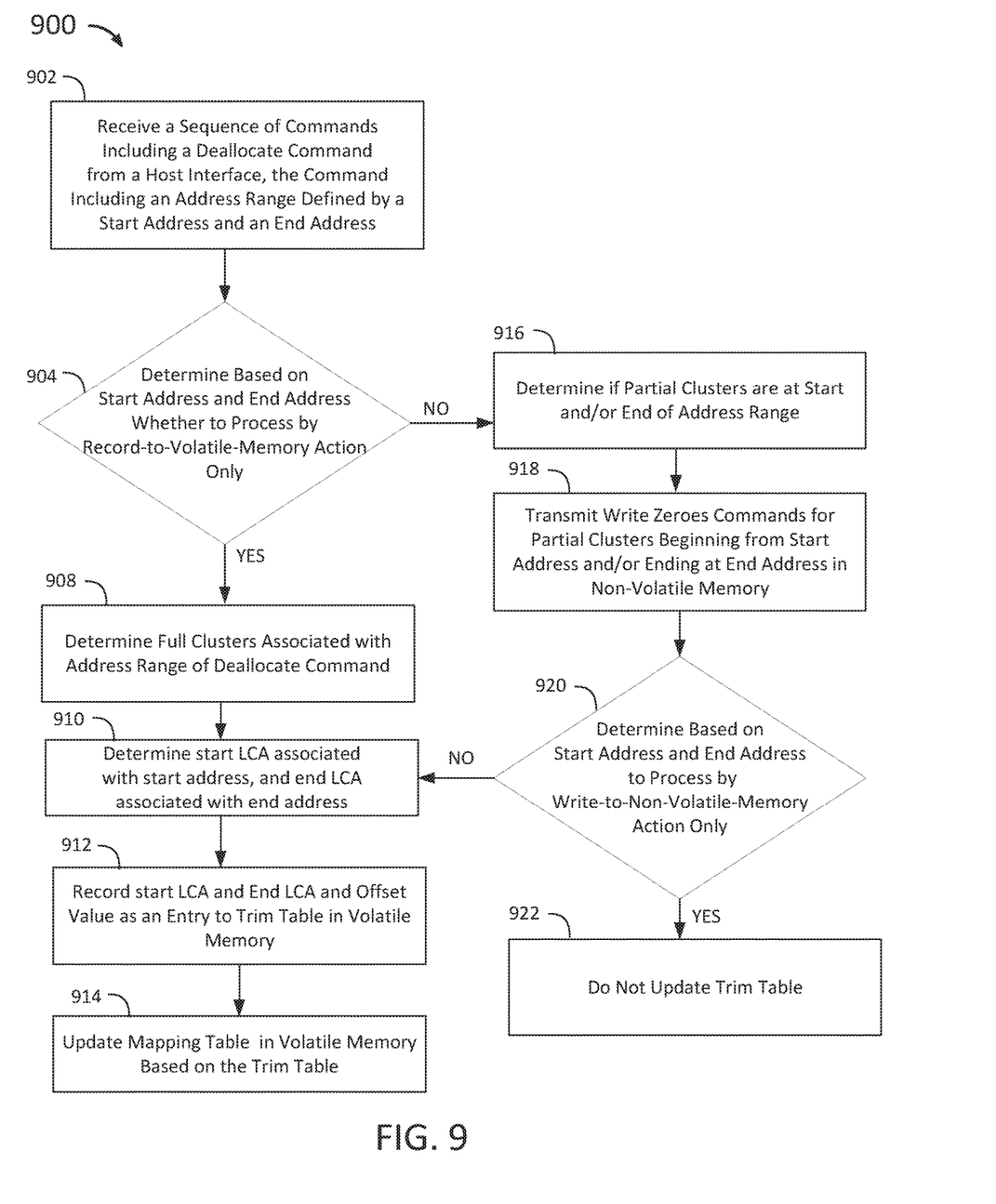
FIG. 9 shows a flow chart of a method of processing deallocate commands.

FIG. 9 shows a flow chart 900 of a method of processing deallocate commands received from a host computer. At step 902, a controller receives a sequence of commands, including a deallocate command from a host interface. The deallocate command includes one or more LBA ranges associated with data in a memory that is no longer in use and should no longer be treated as valid. A start address and range length may define each LBA range, which the controller converts to a start address and an end address. In some implementations, the host interface receives the address range parameters as LBAs, but the controller converts each LBA to an LCA address. At step 904, the controller determines based on the start address and the end address whether an address range of the deallocate command should be processed by a record-to-volatile-memory action only. The controller identifies a first cluster associated with the start LBA and a second cluster associated with the end LBA of each LBA range of the deallocate command. Each of the first cluster and the second cluster has a cluster start LBA and a cluster end LBA indicating the LBA range of the cluster. The controller identifies the first cluster as the cluster that contains in its LBA range the start LBA of the deallocate command, either as the cluster start LBA, the cluster end LBA, or within the LBA range between these. The first cluster and the second cluster may be the same or different clusters. The controller makes a determination based on whether the start address and end address of the range coincide with the boundaries of one or more clusters (e.g., the cluster start LBA and cluster end LBA). For example, as previously explained, because the number of LBA per cluster is 8, the controller may check to determine if the equation "start LBA mod 8=0" is true for the start LBA, and for the end LBA if the equation "end LBA mod 8=7" is true. If the statement is true for either the start LBA or the end LBA, that LBA is aligned with cluster boundaries. If the statement is not true, the LBA is cluster unaligned.

If at step 904, the controller determines that the start address and end address of the address range can be processed by a record-to-volatile-memory action alone, the process moves to step 908. At step 908, the controller determines the one or more full clusters associated with the address range of the deallocated command. The controller determines the cluster start LBA associated with the start address, and the cluster end LBA associated with the end address. The determined cluster start LBA and cluster end LBA may be in the same or different clusters. At step 910, the controller determines the LCA associated with the cluster start LBA and the LCA associated with the cluster end LBA. At step 912, the controller records the determined LCAs and an offset value as an entry to the trim table. The controller may proceed through steps 902-912 for all ranges in the deallocate command before proceeding to step 914. At step 914, the controller updates the L2P mapping table based on the trim table entries.

If, at step 904, the controller determined that the at least one of the start address and end address does not coincide with a cluster boundary, and the address range could not be processed by a record-to-volatile-memory action only, the process would instead move to step 916. At step 916, the controller determines if the partial or unaligned clusters are at the start or end of the address range. The controller compares the start logical address (start LBA) to the cluster start LBA of the first cluster. The controller determines where in the cluster the start LBA is located, and based on the comparison, the controller determines a start LCA value indicating the start of the deallocated or trimmed address range. If the start LBA of the deallocate command corresponds to the start cluster LBA of the first cluster (in other words, a cluster boundary), the controller determines the start LCA value to indicate the start cluster address of the first cluster. If the start LBA of the deallocate command does not correspond to the start cluster address of the first cluster, the controller determines that the deallocate command logical address range includes a partial cluster and, at step 918, separately deallocates the data in the partial cluster by transmitting a Write Zeroes command for the logical block range of the partial cluster. Any partial cluster at the end of the LBA range is handled in a similar manner to a partial cluster at the start of the LBA range, where a Write Zeroes command is used to separately deallocate the data in the logical block range of the partial cluster in the non-volatile memory.

In step 920, the controller determines, based on the start address and end address, whether the address range can be processed by write-to-non-volatile-memory actions only. The controller determines whether the logical address range of the deallocate command includes any full clusters, and if so, determines that the address range cannot be processed only with write-to-non-volatile-memory actions and proceeds to step 910. At step 910, the LCA addresses of the first and last full cluster in the LBA range are determined, and in step 912, these are recorded as the start LCA and end LCA in a trim table entry which is created in the volatile memory. If it is determined at step 920 that no full clusters are included in the logical address range in the deallocate command and the address range can be processed by write-to-volatile-memory actions alone, at step 922 no trim table entry is created.

At step 912, when the deallocate command address includes at least one full cluster, the controller determines an offset value which is an MCO offset into the user data area where the user data cluster in which the deallocate command would have been saved (but is instead recorded in the trim table). At step 914, the controller records the offset value in the trim table entry which has been created for all of the LBA ranges containing full clusters in the deallocate command. The controller thus records the offset value along with the address range (start LCA and end LCA) in the trim table stored in the volatile memory. The controller records the offset value as an MCO offset indicating the sequence position of the deallocate command in the user data area, while the address range indicates how many clusters are included in the deallocate command. In some implementations, the controller also updates a mapping table stored in the volatile memory with a trim signature associated with the address range of deallocated data. The trim signature merely indicates which clusters in the non-volatile memory contain invalid data that has been 'trimmed' or deallocated. In some implementations, the controller sends an indication of command completion to the host after updating the mapping table. In some implementations, the method of processing deallocate commands includes writing the mapping table to a non-volatile memory and erasing the entries in the trim table from the volatile memory when the user data block closes.

Saving deallocate commands as offsets and addresses in a list of entries stored in the volatile memory decreases write amplification and increases drive endurance as compared to conventional deallocate command processing methods that store the commands in the OP space in the non-volatile memory. The list, or trim table, can be saved into a save block during a power failure event and can be used upon reboot to reconstruct the mapping table to ensure coherency and determinism of the deallocation across the power failure event. Further, storage of the deallocate commands in volatile memory improves garbage collection of the non-volatile memory and requires a smaller amount of power than conventional processes. Because no trim buffer space is required in non-volatile memory, the method better utilizes buses and dies associated with the non-volatile memory, and saves secondary power to the buffers.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:
1. A solid state drive (SSD) for processing deallocate commands, the SSD comprising:
    a host interface;
    a controller communicatively coupled to the host interface;
    a non-volatile memory communicatively coupled to the controller and configured to store data received via the host interface in a plurality of data clusters, each data cluster having a cluster start address and a cluster end address; and a volatile memory configured to maintain a trim table and a mapping table indicating which of the plurality of data clusters stored in the non-volatile memory have been deallocated;

the controller configured to:
receive a sequence of commands from the host interface;
receive a deallocate command from the host interface within the sequence of commands, the deallocate command including at least one address range indicating data stored in the non-volatile memory, the at least one address range including a start address and an end address or a start address and a length of the address range, wherein the end address is calculated from the start address and the length of the address range;
start processing of the deallocate command by determining determine, based on the start address and the end address, whether to perform one or both of a write-to-non-volatile-memory action and a record-to-volatile-memory action; and
complete processing of process the deallocate command according to the one or more determined actions.

2. The SSD of claim 1, the controller further configured to:
identify a first cluster including the start address;
compare the start address to a cluster start address of the first cluster;
determine if the start address coincides with the cluster start address of the first cluster; and
if the start address does not coincide with the cluster start address, select a write-to-non-volatile memory action.

3. The SSD of claim 2, wherein the write-to-non-volatile-memory action comprises:
transmitting write zeroes command for a range of logical blocks from the start address to a cluster end address of the first cluster.

4. The SSD of claim 3, wherein the controller is further configured to:
identify a second cluster following the first cluster;
determine if the second cluster includes the end address; and
if the second cluster does not include the end address, selecting a record-to-volatile-memory action comprising recording a cluster start address of the second cluster to the trim table in the volatile memory.

5. The SSD of claim 4, wherein the controller is further configured to:
identify a third cluster including the end address;
compare the end address to a cluster end address of the third cluster; and
determine if the end address coincides with the cluster end address of the third cluster.

6. The SSD of claim 5, wherein if the end address coincides with the cluster end address of the third cluster, the controller is configured to select a record-to-volatile-memory action comprising recording a cluster start address of the third cluster to the trim table in the volatile memory.

7. The SSD of claim 5, wherein if the end address does not coincide with the cluster end address of the third cluster, the controller is configured to select a write-to-non-volatile-memory action comprising:

transmitting a write zeroes command for a range of logical blocks from a start address of the third cluster to the end address in the non-volatile memory.

8. The SSD of claim 7, wherein the controller is further configured to:
identify a fourth cluster preceding the third cluster; and
if the fourth cluster does not include the start address, recording the fourth cluster start address to the trim table in the volatile memory.

9. The SSD of claim 2, wherein if the start address coincides with the cluster start address of the first cluster, the controller is configured to select a record-to-volatile-memory action comprising recording the cluster start address of the first cluster to the trim table in the volatile memory.

10. The SSD of claim 1, wherein after processing the deallocate command, the controller is configured to:
record an offset value indicating a sequence position of the deallocate command within the sequence of commands received from the host interface;
record a start logical cluster address (start LCA) value, and end logical cluster address (end LCA) value in the entry to the trim table; and
update the mapping table to indicate that the address range corresponding to the range from the start LCA value to the end LCA value has been deallocated.

11. The SSD of claim 10, wherein after the mapping table has been updated, the controller is further configured:
write the mapping table to the non-volatile memory; and
erase the entry in the trim table from the volatile memory.

12. The SSD of claim 1, the controller further configured to:
detect that a power failure has occurred,
save the trim table data in an alternative non-volatile memory using a secondary power source;
restore the trim table to volatile memory at a next power up by reading the trim table from the alternative non-volatile memory;
restore a saved mapping table in non-volatile memory to volatile memory at a next power up by reading the mapping table from the non-volatile memory, and
trigger operation of a restore module to update the restored mapping table for a deallocated address range stored in the trim table restored to volatile memory.

13. The SSD of claim 12, wherein the controller is configured to trigger operation of the restore module by:
reading a saved sequence of write commands in a buffer in the non-volatile memory and for each write command in the sequence read from the buffer at an offset, updating the mapping table based on processing each write command until the offset equals a first offset value in the trim table restored to volatile memory;
determining from the trim table restored to volatile memory a first address range associated with the first offset value; and
updating the mapping table restored to volatile memory based on the first offset value and the first address range.

14. A method of processing deallocate commands, the method comprising:
receiving a sequence of commands at a host interface;
receiving a deallocate command from the host interface within the sequence of commands, the deallocate command including at least one address range indicating data stored in a non-volatile memory, the at least one address range including a start address and an end address, or a start address and a length of the address range in logical blocks, wherein an end address is calculated from the start address and the length of the address range, where the data stored in the non-volatile memory is stored in at least one data cluster, each data cluster having a cluster start address and a cluster end address;

starting processing of the deallocate command by determining, based on the start address and the end address, whether to perform one or both of a write-to-non-volatile-memory action and a record-to-volatile-memory action; and completing processing of the deallocate command by performing the one or more determined actions.

15. The method of claim 14, the method further comprising recording an offset value, indicating a sequence position of the deallocate command within the sequence of commands received from the host interface, a start logical cluster address (start LCA) value and an end logical cluster address (end LCA) value in an entry in a trim table maintained in a volatile memory.

16. The method of claim 14, the method further comprising identifying a first cluster including the start address;
identifying a second cluster including the end address;
comparing the start address to the cluster start address of the first cluster;
wherein comparing the start address to the cluster start address of the first cluster further comprises determining if the start address refers to a cluster start address of the first cluster.

17. The method of claim 16,
wherein if the start address refers to the cluster start address of the first cluster, the method further comprises selecting a record-to-volatile memory action comprising:
converting the start address of the address range to start logical cluster address (LCA) value, the start LCA value referring to the cluster start address of the first cluster; and
recording the cluster start address of the first cluster as the start LCA value in the entry in a trim table stored in volatile memory,.
wherein if the start address does not refer to the cluster start address of the first cluster, the method further comprises selecting a write-to-non-volatile memory action comprising:
determining if the first cluster and the second cluster describe the same cluster;
if the first cluster and the second cluster do not describe the same cluster:
identifying a third cluster positioned immediately after the first cluster;
determining a first number of logical blocks between the start address and the cluster start address of the third cluster;
transmitting a command to write zeroes to the first number of logical blocks following the start address; and
recording the third cluster start address as the start LCA value in the entry in the trim table.

18. The method of claim 16, the method further comprising:
determining if the end address of the address range refers to the cluster end address of the second cluster;
if the end address of the address range does coincide with the cluster end address of the second cluster, selecting a record-to-volatile-memory action comprising recording the cluster start address of the second cluster as the start LCA value in the entry in a trim table stored in volatile memory; and
if the end address of the address range does not refer to the cluster end address of the second cluster, selecting a write-to-non-volatile-memory action comprising:
determining a second number of logical blocks between the cluster start address of the second cluster and the end address of the address range; and
transmitting a command to the non-volatile memory to write zeroes to the second number of logical blocks beginning with the cluster start address of the second cluster.

19. The method of claim 14, the method further comprising:
updating a mapping table in the volatile memory based on the entry in the trim table;
writing the mapping table to the non-volatile memory; and
after writing the mapping table to the non-volatile memory, erasing the entry in the trim table in the volatile memory.

20. The method of claim 14, the method further comprising:
detecting that a power failure has occurred;
saving the trim table data in an alternative non-volatile memory using a secondary power source;
restoring the trim table to volatile memory at a next power up by reading the trim table from the alternative non-volatile memory;
restoring a saved mapping table in non-volatile memory to volatile memory at a next power up by reading the mapping table from the non-volatile memory; and
triggering operation of a restore module to update the restored mapping table based on data written to the non-volatile memory and a deallocated address range stored in the trim table restored to volatile memory.

21. The method of claim 20, wherein triggering operation of a restore module further comprises:
reading a saved sequence of write commands at offsets in a buffer in the non-volatile memory and for each write command in the sequence read from the buffer updating the mapping table based on processing each write command until a first offset value in the trim table is reached;
determining from the trim table restored to volatile memory a first address range associated with the first offset value; and
updating the mapping table restored to volatile memory based on the first offset value and the first address range.

* * * * *